INVENTOR
WILLIAM A. DUCKETT
BY
ATTORNEYS

United States Patent Office 3,446,318
Patented May 27, 1969

3,446,318
SUSPENSION SYSTEM AND SEAL MEANS THEREFOR
William A. Duckett, Kingsway, Ossett, England, assignor to Woodhead Manufacturing Company Limited, Kingsway, Ossett, England, a company of Great Britain
Filed Sept. 27, 1967, Ser. No. 671,087
Claims priority, application Great Britain, Sept. 28, 1966, 43,292/66
Int. Cl. F16d 57/00; F16f 9/00; F16j 15/56
U.S. Cl. 188—100
9 Claims

ABSTRACT OF THE DISCLOSURE

A suspension unit for a vehicle comprising a shock absorber of the telescopic hydraulic type, the relatively reciprocating parts respectively of which (i.e. the piston rod and casing) are connected to the sprung and unsprung masses of the vehicle, and an outer cylinder having a closed end connected to the piston rod. The outer cylinder surrounds and is separated by an annular space from the casing and is arranged to slide telescopically with respect thereto. An annular piston and sealing ring assembly forming sealing means is spaced from the closed end of the outer cylinder to provide a chamber for containing a fluid under pressure serving partially or wholly to support the sprung mass from the unsprung mass, the sealing means including a retaining ring biassing a sealing ring against a face of the piston assembly, the retaining ring being formed of low friction material.

---

Figures 1, 4:
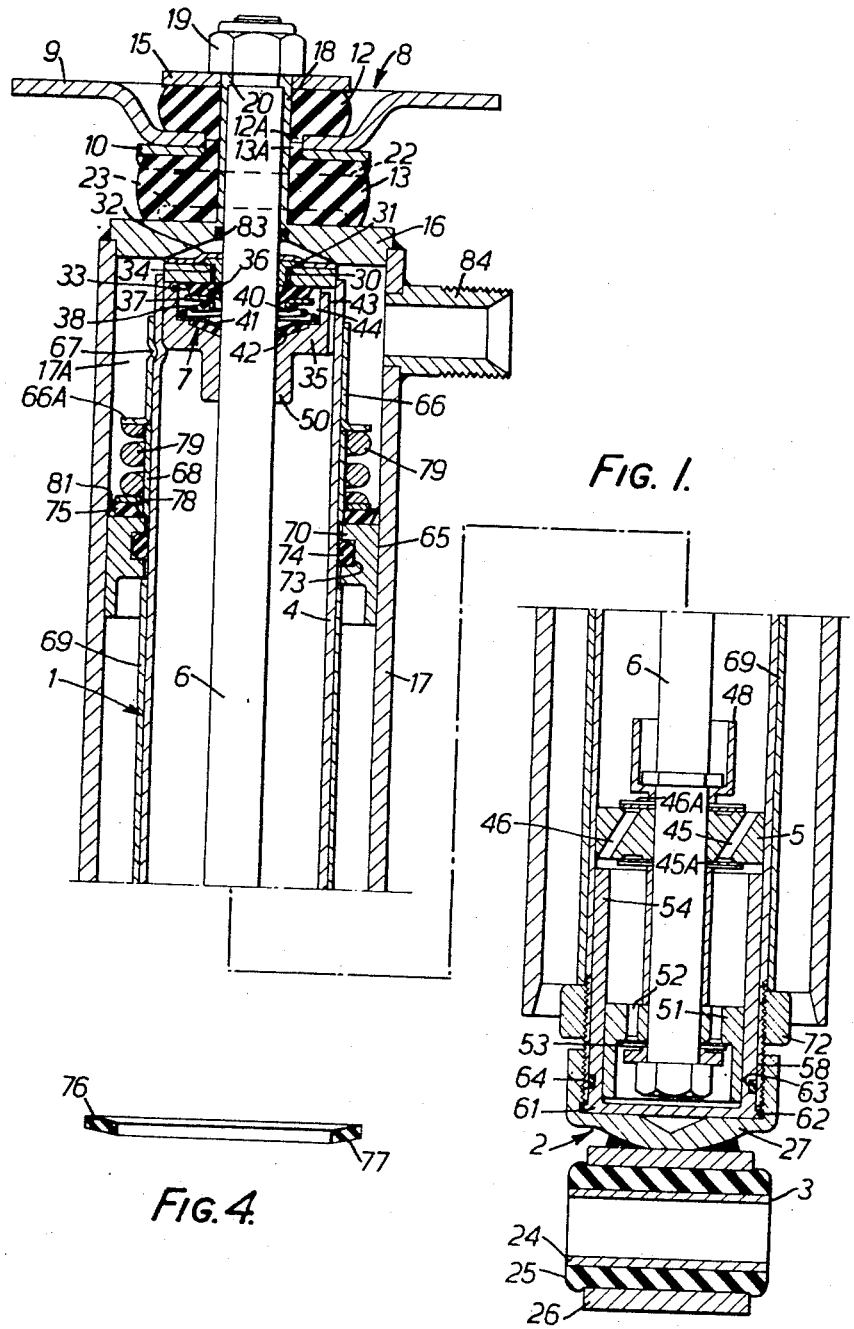

This invention relates to vehicle suspension systems and is more particularly concerned with a suspension unit incorporating a vibration damper or so-called shock absorber, which term will be used herein for convenience.

The shock absorbers incorporated in suspension units according to the present invention are of the telescopic hydraulic type, that is to say of the type in which the relatively reciprocating parts include a working cylinder closed at one end, a piston arranged to slide in the working cylinder and having passages therein permitting flow of fluid from one side thereof to the other, a piston rod connected to the piston and extending through the fluid seal at the other end of the cylinder, and means for connection of the relatively reciprocating parts respectively to the sprung and unsprung masses of the vehicle.

In some cases the working fluid in the shock absorber is a liquid while in other cases it is partly liquid and partly in the form of a compressed gas, in which case the working fluid may be partly or wholly in the form of an emulsion of liquid and gas, at least during operation.

The invention is more particularly concerned with a suspension unit incorporating a telescopic hydraulic type of shock absorber in which there is an outer cylinder surrounding and separated by an annular space from the shock absorber and which is arranged to slide telescopically with respect thereto, the cylinder having a closed end connected to the piston rod of the shock absorber while there is provided between the shock absorber and the outer cylinder sealing means spaced from the closed end of the outer cylinder to provide a chamber for containing a fluid under pressure serving partially or wholly to support the sprung mass from the unsprung mass of the vehicle.

Such suspension units are often incorporated as assister suspension units to the main suspension on a vehicle so as to provide additional support to support a load on a vehicle, and may be used for example, to maintain a predetermined ride height with varying load conditions, the ride height being adjusted by variation of the pressure in the fluid chamber.

Various arrangements of such suspension units have been proposed but it has not been found possible to provide a sliding seal between the outer cylinder and the shock absorber which will seal efficiently, have the necessary durability for a unit of the kind in question and still have negligible friction, particularly static friction, against the wall with which it is in sealing engagement.

In order to overcome these difficulties it has been proposed to provide a so-called "rolling diaphragm," in which an elongated diaphragm is attached both to the outer cylinder and to the shock absorber, the diaphragm being of sufficient length to accommodate variations in position of the shock absorber with respect to the outer cylinder and at the same time to provide satisfactory sealing. Such rolling diaphragms have, however, not proved to be entirely reliable and are also expensive to manufacture. In particular, rolling diaphragms are unsuitable for use in suspension units of the present kind where they are employed as assister suspensions as they are often required to operate at zero pressure, for example when there is insufficient load to require their being put into operation, as in order to prevent failure of the diaphragm by friction between the surfaces, which contact one another when there is no pressure, it is always necessary with such rolling diaphragms to operate them at a low pressure, e.g. 10 p.s.i.g.

The present invention is concerned with providing sealing between the two sliding parts which will operate satisfactorily at zero pressure, will be economical to manufacture, will have negligible friction and will operate with the minimum of maintenance and lubrication.

According to the present invention a suspension unit for a vehicle comprises a shock absorber of the telescopic hydraulic type, the relatively reciprocating parts of which include an inner cylinder closed at one end, a piston arranged to slide in the inner cylinder and having passages therein permitting flow of fluid from one side thereof to the other, a piston rod connected to the piston and extending through a fluid seal at the other end of the inner cylinder, means for connection of the relatively reciprocating parts respectively to the sprung and unsprung masses of the vehicle, and an outer cylinder surrounding and separated by an annular space from the inner cylinder and arranged to slide telescopically with respect thereto, and having a closed end connected to the piston rod while there is provided between the inner and outer cylinders sealing means spaced from the closed end of the outer cylinder to provide a chamber for containing fluid under pressure serving partially or wholly to support the sprung mass from the unsprung mass, the sealing means being in the form of an annular piston assembly connected to one of the telescopically sliding parts and a sealing ring of flexible resilient material mounted on the face of the piston assembly and urged by spring means against the face of the piston assembly and into sealing engagement with the other telescopically sliding part.

An annular retaining ring may be interposed between the spring means and the sealing ring and in the preferred construction the piston assembly is connected to the shock absorber. In this case the sealing ring is preferably in the form of a thin annular sealing element of rubber or like deformable resilient material which in its undistorted state has upper and lower frusto-conical surfaces the outer diameter of which is substantially the same as the inner diameter of the outer cylinder the ring being urged into flat form so that it attempts to assume a greater diameter and thereby seals against the outer cylinder.

The sealing ring will normally be mounted on the face of the piston assembly communicating with the chamber containing pressure fluid. In this case lubrication of the sealing ring may be provided by the pressure fluid, if this is liquid, or sufficiently liquid in composition to lubricate the seal without additional lubrication being provided, or a small amount of lubricating fluid may be applied to the sealing ring if the pressure fluid is gaseous.

In one construction the annular retaining ring is formed of self-lubricating material and has its outer periphery in sliding engagement with the outer cylinder.

In any case the suspension unit may include a piston assembly comprising two axially extending members the inner one of which (the term inner being used with respect to the side of the piston containing pressure fluid) is in engagement with the sealing ring and has its outer periphery spaced from the outer cylinder while the outer member is in sliding engagement with the outer cylinder. The outer member of the piston assembly may also have its surface which is in sliding engagement with the outer cylinder formed of self-lubricating material.

Further sealing means may be provided between the piston assembly and the part to which it is connected and in which case the further sealing means may be in the form of an O-ring housed in an annular groove formed between the piston assembly and the part to which it is connected. Moreover, the two axially extending members may have interengaging faces in at least one of which is formed the annular groove housing the O-ring.

In one construction the piston assembly is located between two sleeves arranged concentrically with respect to the telescopically sliding parts, and in the case where the piston assembly is connected to the outer cylinder of the shock absorber, the sleeves closely surrounding the shock absorber. The sleeves may be retained by being urged against an abutment formed integrally with or secured adjacent one end of the shock absorber and at the other end by a threaded locking ring co-operating with an externally threaded part adjacent the other end of the shock absorber.

Figure 2:
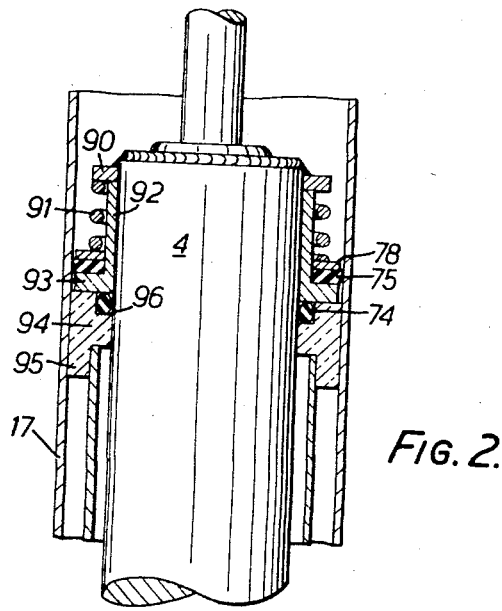
Figure 3:
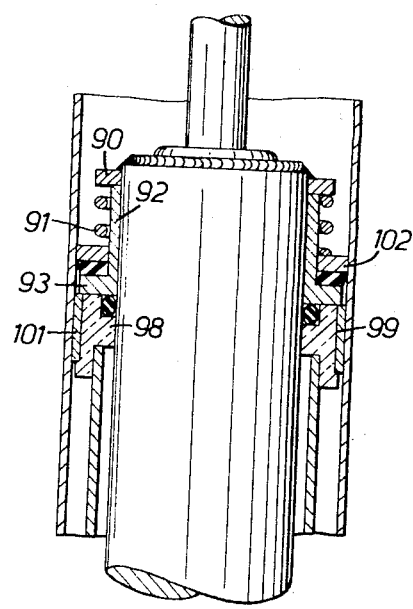

The invention may be carried into practice in various ways but one construction of suspension unit according to the present invention together with two modifications thereof will now be described by way of example with reference to the accompanying drawings, in which:

FIGURE 1 is a cross section through a suspension unit according to the invention, FIGURE 2 is a cross section through an alternative form of piston and sealing assembly which may be used in the construction of FIGURE 1, FIGURE 3 is a further alternative form of piston and sealing assembly, and FIGURE 4 is a cross section through the sealing ring shown in FIGURES 1 to 3.

As shown in the drawings the shock absorber indicated generally at 1 is arranged to be connected at its lower end 2 by means of a mounting, indicated generally at 3, to the unsprung part of a vehicle upon which it is to be incorporated. The shock absorber is of the pressurised kind and comprises a working cylinder 4 in which is arranged to slide a piston 5 to which is connected a piston rod 6 extending through fluid sealing means, indicated generally at 7, in the upper end of the working cylinder. The upper end of the piston rod is arranged to be connected by mounting means, indicated generally at 8, to the sprung part of the vehicle.

The upper mounting means 8 comprises a mounting plate 9 for connection to the sprung part of the vehicle and a guide plate 10, both plates having openings through which the piston rod passes and to which it is attached through rubber bushes 12 and 13 having respectively cylindrical spigots 12A and 13A extending into the openings in the plates 9 and 10. The bushes 12 and 13 are compressed between a retaining ring 15 and the upper end 16 of an outer cylinder 17 concentric with and surrounding the working cylinder 4. The cylinder 17 has a sleeve 18 extending upwardly from its upper end surrounding the piston rod 6 and passing inside the bushes 12 and 13 up to the centre of the retaining ring 15 where shoulders 20 on the upper end of the sleeve 18 are urged towards the piston rod when nut 19, which is in screw-threaded engagement with the upper end of the piston rod, is tightened. The upper bush 12 is cylindrical while the lower bush 13 has flat sides which co-operate with tangs on the guide plate 10 and strips on the upper end of the outer cylinder, shown in broken lines at respectively 22 and 23, to prevent the cylinder 17 and the components attached thereto including the piston rod from rotating about the shock absorber.

The lower mounting 3 comprises a metal sleeve 24 to which is bonded a rubber sleeve 25, the sleeves 24 and 25 being pressed within a steel bush 26 to which the sleeve 25 is secured by being an interference fit therewith. The bush 26 is welded to a cap 27 forming the lower end of the shock absorber. The mounting 3 is secured to the unsprung part of the vehicle by means of a bolt passing through the sleeve 24.

The sealing means indicated generally at 7 at the upper end of the shock absorber itself is of similar construction to that described in the present applicant's British patent specification No. 1,033,810 and comprises a dirt excluder ring 30 through the bore of which the piston rod extends with close but free fit, this ring having a radially extending flange 31 which is located closely but freely between a dished plate 32 and an end cap 33 closing the end of the working cylinder 4. The bore of the ring 30 may be formed of self-lubricating material such as sintered bronze containing an appropriate ingredient or ingredients and a small annular gap 34 is provided between the bore of the end cap 33 and the part of the sealing ring 30 which lies therein to enable the sealing ring 30 to take up its correct position of alignment with the piston rod 6 and thus prevent the occurrence of any heavy radial loading between the bore of the sealing ring and the rod. Rigidly secured within the cylinder 4 is a guide member 35 through which the piston rod 6 can slide freely but with a close fit and disposed within a cup-like recess in the upper end of the guide member 35 is a fluid sealing assembly comprising a ring 36 of rubber or like resilient material formed and arranged for example in the manner described in the specification of the present applicant's British patent specification No. 920,959 so that in its undistorted state it is of generally frusto conical form with a cylindrical bore whereas when it is assembled it is maintained flat by a plate 37 under the action of a spring 38 so that its bore tends to assume a frusto conical form with a lip 40 at its lower end pressing against the piston rod 6. The bore of the plate 37 is slightly larger than that of the lip 40 and is formed as shown so that the lip enters this bore, the arrangement being such that the interior of the working cylinder 4 can be charged under pressure through the bore of the ring 37 but the escape of fluid under pressure from the interior of the cylinder 4 is prevented by the lip 40.

As will be seen the lower end of the spring 38 abuts against a cup-shaped washer 41 which in turn bears on a sealing ring 42 of inverted but otherwise generally similar form to the sealing ring 36. A passage 43 connects the upper end of the chamber 44 formed between the sealing rings 36 and 42 with the upper end of the working cylinder 4.

The piston assembly indicated generally at 5 is of conventional form and comprises passages 45 and 46 extending therethrough the flow of fluid through which is controlled respectively by valving 45A and 46A. Connected to the piston rod 6 is an upper subsidiary piston 48 arranged to engage with a subsidiary cylinder 50 formed by an axially extending flange on the part 35 (the terms piston and cylinder are used for convenience), the cylinder 48 and/or the piston 50 having a tapering bore and/or a bleed notch or notches arranged so as to form a leakage path whose cross sectional area progressively diminishes as the subsidiary piston enters the subsidiary piston 51 having passages 52 extending through the shock transmitted when the piston 5 reaches the end of its stroke on full rebound.

Connected to the other side of the piston 5 is a subsidiary piston 51 having passages 52 extending through it and controlled by non-return valve means 53, the subsidiary piston 51 being arranged to enter a subsidiary cylinder 54 at the lower end of the working cylinder 4, there being provided, as in the case of the subsidiary piston and cylinder 50 and 48, bleed notches and/or a tapering bore to provide increasing resistance as the piston 51 enters the subsidiary cylinder 54 so as to prevent or substantially reduce the shock loading as the main piston assembly 5 reaches the full bump position. The arrangement of the susbidiary piston and cylinder assemblies forms the subject of the present applicant's United States patent application No. 621,987 filed March 9, 1967.

As mentioned above the shock absorber is of the pressurised kind, that is to say the working fluid comprises an unseparated mixture of liquid and gas under pressure which during operations at least is in the form of an emulsion, having a degree of elasticity such in relation to the resistance offered to flow through the appropriate passage or passages in the piston, that for movements of the piston relative to the cylinder in at least one direction there occurs additional compression of fluid on the appropriate side of the piston in company with decompression on the other side, creating a pressure differential across the piston and flow through the piston against the resistance offered by such passage or passages.

Although the shock absorber described is of the pressurised kind which has been found most suitable for the present application, shock absorbers of the conventional unpressurised kind may be used.

The cap 27 at the lower end of the working cylinder 4 is threaded internally at 58 to engage with external threads on the lower end of the working cylinder 4, the subsidiary cylinder 54 is formed with a base 61 greater in diameter than the working cylinder bore to provide a flange 62 which is trapped between the end of the working cylinder and the cap 27. A groove 63 is provided in the outer wall of the subsidiary cylinder 54 in which is an O-ring 64 to provide sealing between the subsidiary cylinder and the working cylinder.

The outer cylinder 17 is concentric with the working cylinder 4 and spaced therefrom and is arranged to slide telescopically with respect thereto. Fluid under pressure is contained in the annular space 17A formed between the two cylinders and serves partially or wholly to support the sprung mass from the unsprung mass, the fluid being retained by sealing means indicated generally at 65 and more fully described hereafter.

Surrounding the upper end of the working cylinder 4 is a sleeve 66 having a radially extending flange 66A at its lower end and secured by dimpling 67 to the working cylinder 4 (by which same dimpling the piston rod guide 35 is retained at its lower end in the working cylinder 4). Surrounding the working cylinder 4 below the sleeve 66 is a spacer sleeve 68 and below this is a further long spacer sleeve 69 and between which spacer sleeves is located and retained an annular piston 70. The piston 70 is retained in position by being locked between the two spacer sleeves 68 and 69 which is effected by means of a screwthreaded locking ring 72 engaging the lower externally threaded end of the working cylinder 4. The piston 70 is provided with an internal groove 73 in which is located an O-ring 74 to ensure sealing between it and the working cylinder. The piston 70 is arranged to be a clearance fit with the outer cylinder.

Mounted on the upper face of the piston 70 is a sealing ring 75 which in its free state is in the form shown in FIGURE 4. The sealing ring 75 is of rubber or other elastomer having frusto conical top and bottom surfaces 76 and 77, while the bore and outer periphery are cylindrical. The outer diameter is the same as the bore of the cylinder 17 and no interference is necessary. On installation the seal is urged into its flat state between the upper face of the piston 70 and an annular retaining ring 78 of smaller diameter than the bore of the cylinder 17 which is held in position against the sealing ring 75 by means of a helical compression spring 79. The spring load provides the initial sealing pressure at the seal/piston interface and the section shape change imposed upon the seal 75 attempts to increase its outside diameter against the constraint of the bore of the cylinder 17 to provide a mutual initial sealing pressure which diminishes from the leading edge or lip 81 of the ring 45 towards the piston face while additional sealing pressure is provided by the fluid in the space above the piston 70. In the case where the fluid is air or gas a pool of lubricant is deposited in the annulus containing the seal 75 to lubricate the cylinder bore and seal lip 81.

Further sealing means in the form of an O-ring 83 positioned in a groove in the upper end 16, are provided to ensure sealing between the piston rod 6 and the upper end 16 of the cylinder 17.

The position of the parts shown in the drawings is that of "full bump" but in operation the fluid pressure in the chamber 17A serves to support partially or wholly the sprung mass from the unsprung mass. The fluid may be contained wholly within the chamber 17A or a connection 84 may be provided to a separate fluid reservoir. Normally the supporting fluid is a gas but a liquid may equally well be used in the chamber 17A, in which case the connection 84 would be used to connect to a remote springing medium with which the liquid is in load transmitting proximity and which remote springing medium would thus support the vehicle by pressurising the fluid in the chamber 17A and would be operated by the movement of fluid to and from the chamber 17A on relative movement of the sprung mass with respect to the unsprung mass.

With a number of concentric reciprocating parts it is difficult to provide a construction which can be mass-produced economically and still retain the essential close sliding fits and freedom from binding which satisfactory operation demands. In the present construction this difficulty is overcome since the most free transverse position of the piston 70 can be selected within the clearance provided between the bore of the piston and the shock absorber so as to cancel the accumulated eccentricities, and the piston retained in this position by tightening the locking ring. Thus, the clearance between the piston 70 and the working cylinder 4 is selected to accommodate the variations without loss of the initial sealing "nip" of the O-ring which is of substantial section to provide latitude in this respect. The axial position of the piston may also be adjusted by selection of appropriate sleeve lengths.

An alternative form of piston and sealing assembly which may be used in place of the piston and sealing assembly shown in FIGURE 1 is shown in FIGURE 2. In this construction an annular ring 90 is welded to the upper end of the working cylinder 4 and forms an abutment for the upper end of a spring 91 similar to the spring 79. An upper sleeve 92 has its upper end abutting against the ring 90 while its lower end is formed with a radially outwardly directed flange 93 the outer edge of which is adjacent to but spaced slightly inwardly from the wall of the cylinder 17. The retaining ring and sealing ring are similar to those shown in FIGURE 1 and have been given the same reference numerals, respectively 78 and 75.

The piston assembly in this construction is formed from two axially extending members the upper member being formed by the radially directed flange 93 while the lower member is formed by a piston part 94 of sintered material having at its lower face an axially extending flange 95 extending a small distance down the lower sleeve 69. An annular recess 96 is formed in the upper surface of the part 94 and in which is disposed the O-ring 74 which is thus retained in position by the flange 93.

FIGURE 3 shows a further alternative arrangement of piston and sealing assembly which is somewhat similar to that shown in FIGURE 2. In this construction the annular retaining ring 90, the spring 91 and sleeve 92, together with its flange 93, are the same as that shown in FIGURE 2. The piston part of the piston assembly is also somewhat similar in shape to the part 94, a similar recess 96 being provided in its upper surface in which the O-ring 74 is retained by means of the flange 93. The lower member of the piston assembly, designated 98, is formed of steel and has an annular recess 99 in its outer surface containing an annular ring 101 of low friction material arranged to be a close sliding fit within the cylinder bore. The strip 101 has a gap in a part of its circumference in a manner similar to a piston ring to allow for expansion, the ends of the gap being angled or square.

Arranged above the sealing ring 35 is a second ring 102 of low friction material which forms an abutment for the lower end of the spring 91 and which has its outer surface in sliding engagement with the bore of the cylinder 17. The low friction material used in the ring 101 and 102 may be polytetrafluoroethylene or may be a filled P.T.F.E.

What I claim as my invention and desire to secure by Letters Patent is:

1. A suspension unit for a vehicle comprising a shock absorber of the telescopic hydraulic type, the relatively reciprocating parts of which include an inner cylinder closed at one end, a piston arranged to slide in the inner cylinder and having passages therein permitting flow of fluid from one side thereof to the other, a piston rod connected to the piston and extending through a fluid seal at the other end of the inner cylinder, means for connection of the relatively reciprocating parts respectively to the sprung and unsprung masses of the vehicle, and an outer cylinder surrounding and separated by an annular space from the inner cylinder and arranged to slide telescopically with respect thereto, and having a closed end connected to the piston rod and sealing means between the inner and outer cylinders, said sealing means being spaced from the closed end of the outer cylinder to provide a chamber for containing a fluid under pressure serving at least partially to support the sprung mass from the unsprung mass, the sealing means being in the form of an annular piston assembly connected to one of the telescopically sliding parts, a sealing ring of flexible resilient material mounted on one face of the piston assembly, an annular retaining ring formed from a low friction material and engaging the sealing ring, and spring means engaging the retaining ring and biassing the sealing ring into engagement with the face of the piston assembly and into sealing engagement with the other telescopically sliding part.

2. A suspension unit as claimed in claim 1 in which the piston assembly is connected to the absorber and in which the sealing ring is in the form of a thin annular sealing element of rubber or like deformable resilient material which in its undistorted state has upper and lower frusto-conical surfaces, the outer diameter of which is substantially the same as the inner diameter of the outer cylinder the ring being urged into flat form so that it attempts to assume a greater diameter and thereby seals against the outer cylinder.

3. A suspension unit as claimed in claim 1 in which the annular retaining ring is formed of self-lubricating material and has its outer periphery in sliding engagement with the outer cylinder.

4. A suspension unit as claimed in claim 1 in which the sealing ring is mounted on the face of the piston assembly communicating with the chamber containing pressure fluid.

5. A vehicle suspension unit as claimed in claim 4 in which the piston assembly comprises two axially extending members the inner one of which is in engagement with the sealing ring and has its outer periphery spaced from the outer cylinder while the outer member is in sliding engagement with the outer cylinder.

6. A vehicle suspension unit as claimed in claim 5 in which the outer member has its surface which is in sliding engagement with the outer cylinder, formed of self-lubricating material.

7. A suspension unit as claimed in claim 1 characterized in that the piston assembly is located between two sleeves arranged concentrically with respect to the telescopically sliding parts.

8. A suspension system as claimed in claim 7 characterized in that the sleeves closely surround the shock absorber and that the piston assembly is connected to the shock absorber.

9. A suspension system as claimed in claim 8 in which the sleeves are retained by being urged against an abutment formed integrally with or secured adjacent one end of the shock absorber and at the other end by a threaded locking ring co-operating with an externally threaded part adjacent the other end of the shock absorber.

References Cited

UNITED STATES PATENTS

| | | |
|---|---|---|
| 2,857,184 | 10/1958 | Mancusi. |
| 2,943,711 | 7/1960 | Rossman. |
| 3,236,339 | 2/1966 | Duckett. |
| 3,330,570 | 7/1967 | Sherrill _____ 267—64 |
| 3,375,001 | 3/1968 | Hennells _____ 267—64 |

GEORGE E. A. HALVOSA, Primary Examiner.

U.S. Cl. X.R.

267—64; 280—124; 277—99